(12) United States Patent
Sasaki

(10) Patent No.: US 8,979,285 B1
(45) Date of Patent: Mar. 17, 2015

(54) FORWARD VIEW BICYCLE MIRROR ASSEMBLY

(76) Inventor: Larry Sasaki, Shreveport, LA (US)

(*) Notice: Subject to any disclaimer, the term of this patent is extended or adjusted under 35 U.S.C. 154(b) by 333 days.

(21) Appl. No.: 13/584,475

(22) Filed: Aug. 13, 2012

(51) Int. Cl.
*G02B 7/18* (2006.01)
*G02B 7/182* (2006.01)

(52) U.S. Cl.
CPC .................... *G02B 7/1824* (2013.01)
USPC ....................................... 359/842

(58) Field of Classification Search
CPC ........ B62J 29/00; B60R 1/078; G02B 7/1824
USPC ....................................... 359/842
See application file for complete search history.

(56) References Cited

U.S. PATENT DOCUMENTS

| | | | |
|---|---|---|---|
| 3,981,567 A * | 9/1976 | Cululi et al. | ................ 359/842 |
| 4,375,316 A | 3/1983 | LeVantine | |
| 5,148,327 A | 9/1992 | Gaxiola, Jr. | |
| 5,760,865 A | 6/1998 | Webster | |
| 6,010,225 A | 1/2000 | Lerner et al. | |
| 2004/0246602 A1 | 12/2004 | McGuinness | |
| 2007/0091480 A1 | 4/2007 | Varnes | |
| 2011/0261453 A1 | 10/2011 | Felt | |

* cited by examiner

*Primary Examiner* — Jennifer L. Doak
(74) *Attorney, Agent, or Firm* — R. Keith Harrison

(57) ABSTRACT

A forward view bicycle mirror assembly for attachment to a handlebar of a bicycle includes an elongated assembly frame adapted for attachment to the handlebar; a mirror carriage slidably carried by the assembly frame, the mirror carriage selectively adjustable in position along a longitudinal axis of the assembly frame; and a forward view mirror carried by the mirror carriage.

14 Claims, 5 Drawing Sheets

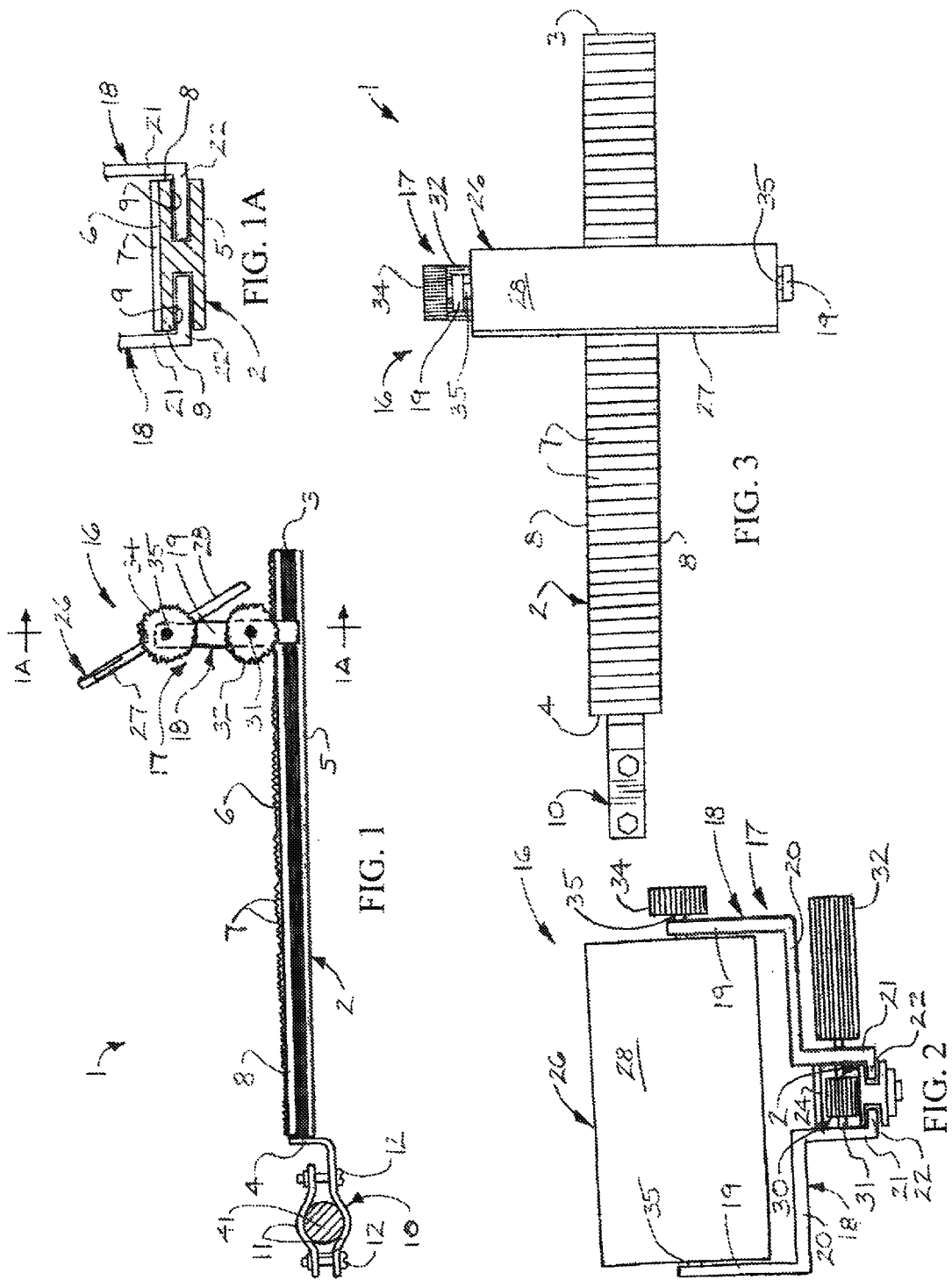

FORWARD VIEW BICYCLE MIRROR ASSEMBLY

FIELD

Illustrative embodiments of the disclosure generally relate to bicycle mirrors. More particularly, illustrative embodiments of the disclosure relate to a forward view bicycle mirror assembly which enables a rider of a bicycle to view an area in front of the bicycle without the need of maintaining his or her head in a raised position for a prolonged period of time.

BACKGROUND

Cycling has become an increasingly popular sport over the years. A typical conventional street bicycle has multiple gears which a bicycle rider can selectively change to achieve a wide range of riding speeds. A rider of a conventional 10-speed bicycle sits on a seat and grips a pair of handlebars attached to the front wheel of the bicycle. Because the seat is typically almost as high as the handlebars, the rider sits in a forward-leaning riding position. Consequently, the rider typically must keep his or her head raised while riding to continually view the area in front of the bicycle for obstructions. On long rides, however, maintaining the head in a raised position tires the rider's neck muscles and renders the ride uncomfortable.

Accordingly, a forward view bicycle mirror assembly which enables a rider of a bicycle to view an area in front of the bicycle without the need of maintaining his or her head in a raised position for a prolonged period of time is needed.

SUMMARY

Illustrative embodiments of the disclosure are generally directed to a forward view bicycle mirror assembly for attachment to a handlebar of a bicycle. The forward view bicycle mirror assembly may include an elongated assembly frame adapted for attachment to the handlebar; a mirror carriage slidably carried by the assembly frame, the mirror carriage selectively adjustable in position along a longitudinal axis of the assembly frame; and a forward view mirror carried by the mirror carriage.

Illustrative embodiments are further generally directed to a forward view bicycle camera assembly for attachment to a handlebar of a bicycle. An illustrative embodiment of the forward view bicycle camera assembly includes an elongated assembly frame adapted for attachment to the handlebar: a camera carried by the assembly frame; a display carriage slidably carried by the assembly frame, the display carriage selectively adjustable in position along a longitudinal axis of the assembly frame: and a display carried by the display carriage and communicating with the camera through a data receiving communication pathway.

BRIEF DESCRIPTION OF THE DRAWINGS

Illustrative embodiments of the disclosure will now be described, by way of example, with reference to the accompanying drawings, in which:

FIG. 1 is a side view of an illustrative embodiment of the forward view bicycle mirror assembly:

FIG. 1A is a cross-sectional view, taken along section lines 1A-1A in FIG. 1;

FIG. 2 is a front view of an illustrative embodiment of the forward view bicycle mirror assembly:

FIG. 3 is a top view of an illustrative embodiment of the forward view bicycle mirror assembly;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper" and "lower" herein are used with reference to relative positions of various elements with respect to each other in exemplary application of the orthotic joint stabilizing assembly and are not intended to be used in a limiting sense.

Figure 4:
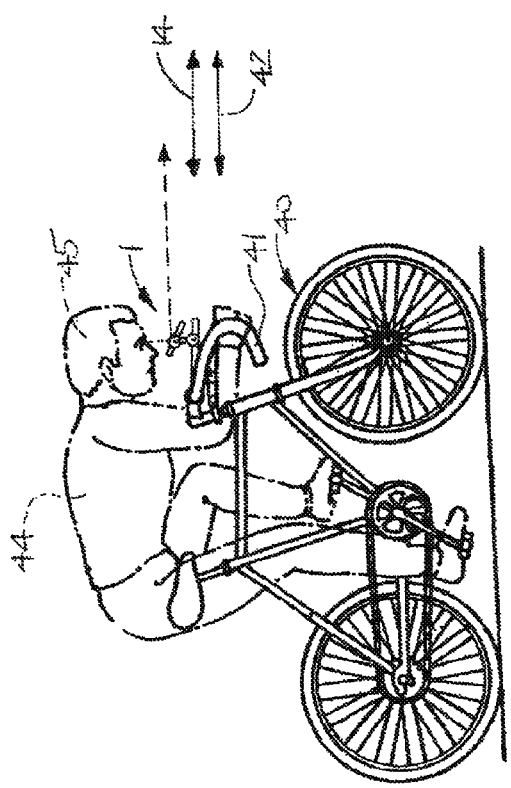
FIG. 4 is a side view of a bicycle, with an illustrative embodiment of the forward view bicycle mirror assembly mounted on the bicycle and a rider pedaling the bicycle and viewing an area in front of the bicycle using the assembly.
Figure 5:
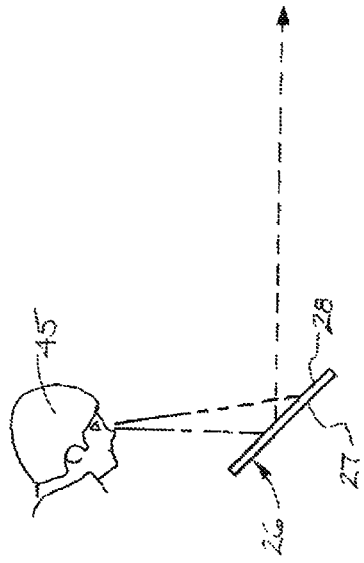
FIG. 5 is a schematic diagram illustrating a rider viewing an area in front of the bicycle using the forward view bicycle mirror assembly.

Referring initially to FIGS. 4 and 5 of the drawings, an illustrative embodiment of the forward view bicycle mirror assembly is generally indicated by reference numeral 1. As will be hereinafter further described, the forward view bicycle mirror assembly 1 is adapted to be mounted on the handlebars 41 of a bicycle 40, which may be conventional. The forward view bicycle mirror assembly 1 enables a bicycle rider 44 to view an area in front of the moving bicycle 40 without the need for the bicycle rider 44 to maintain his or her head 45 in a raised position for a prolonged period of time. This expedient prevents the neck muscles of the bicycle rider 44 from tiring as readily as would otherwise be the case if the bicycle rider 44 were required to maintain his or head 45 in a raised position to continually view the area in front of the moving bicycle 40. Consequently, the bicycle rider 44 remains more comfortable while riding the bicycle 40, particularly on long rides. The various components of the bicycle mirror assembly 1 may be metal, plastic, composite and/or other suitable material and may be fabricating using casting, molding, machining and/or other suitable fabrication techniques known by those skilled in the art.

Referring to FIGS. 1-8 of the drawings, the bicycle mirror assembly 1 includes an elongated assembly frame 2. In use of the bicycle mirror assembly 1, which will be hereinafter described, the assembly frame 2 is adapted for attachment to a handlebar 41 (FIG. 1) on the bicycle 40. As illustrated in FIG. 4, the assembly frame 2 may be mounted such that a longitudinal frame axis 14 of the assembly frame 2 is oriented in generally parallel relationship to a longitudinal bicycle axis 42 of the bicycle 40. As illustrated in FIGS. 1-3, a mirror carriage 16 is slidably mounted on and selectively adjustable in position along the assembly frame 2. A forward view mirror 26 is supported by the mirror carriage 16. In some embodiments, the angle of the plane of the forward view mirror 26 relative to the plane of the assembly frame 2 may be selectively adjustable, as will be hereinafter described. As illustrated in FIGS. 1 and 3, the assembly frame 2 may be generally rectangular with a forward frame end 3, a rearward frame end 4, a lower frame surface 5, an upper frame surface 6 and parallel frame sides 8 extending between the forward frame end 3 and the rearward frame end 4.

The mirror carriage 16 is slidably mounted for selective positioning along the longitudinal frame axis 14 (FIG. 4) of the assembly frame 2 according to the knowledge of those skilled in the art. In some embodiments, a pair of frame grooves 9 (FIG. 1A) may extend into and along the respective frame sides 8 from the forward frame end 3 to the rearward frame end 4 of the assembly frame 2. The mirror carriage 16 may slidably engage the frame grooves 9. As illustrated in FIG. 2, the mirror carriage 16 may include a carriage frame 17 having a pair of generally symmetrical carriage frame arms 18 in opposing relationship to each other on opposite sides of the assembly frame 2. The carriage frame arms 18 of the carriage frame 17 may include a pair of spaced-apart and generally parallel mirror engaging segments 19, a pair of middle arm segments 20 extending perpendicularly inwardly toward each other from the respective mirror engaging segments 19, a pair of spaced-apart and generally parallel pinion support segments 21 extending perpendicularly from the respective middle arm segments 20 and a pair of groove insertion segments 22 extending perpendicularly inwardly toward each other from the respective pinion support segments 21. The groove insertion segments 22 of the respective carriage frame arms 18 insert into the frame grooves 9 in the respective frame sides 8 of the assembly frame 2. A frame arm connecting member 24 may connect the pinion support segments 21 of the respective carriage frame arms 18.

Figure 8:
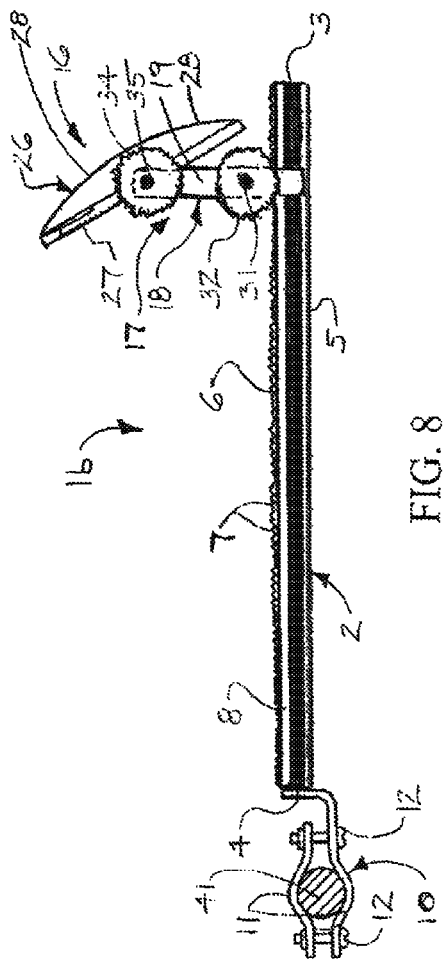
FIG. 8 is a side view of another alternative illustrative embodiment of the forward view bicycle mirror assembly having a convex reflective surface.

The forward view mirror 26 may be generally elongated and rectangular or any other shape which is consistent with the functional requirements of the forward view bicycle mirror assembly 1. The forward view mirror 26 may include a mirror base 27 and a reflective surface 28 on the mirror base 27. As illustrated in FIG. 1, in some embodiments the reflective surface 28 may be flat or planar. As illustrated in FIG. 8, in other embodiments indicated by reference numeral 1b, the reflective surface 28 may be convex to impart a wider range of view of the area in front of the bicycle 40. The forward view mirror 26 may be supported by the mirror engaging segments 19 of the respective carriage frame arms 18 of the carriage frame 17. In some embodiments, the forward view mirror 26 may be pivotally mounted between the mirror engaging segments 19. Accordingly, the angle of the plane of the forward view mirror 26 relative to the plane of the assembly frame 2 may be selectively adjusted. As illustrated in FIG. 2, in some embodiments, a pair of mirror mount shafts 35 may pivotally mount the forward view mirror 26 between the mirror engaging segments 19 of the carriage frame arms 18. An angular mirror positioning knob 34 may engage one of the mirror mount shafts 35. The angular mirror positioning knob 34 may be manually rotated to selectively position the angle of the plane of the forward view mirror 26 relative to the plane of the assembly frame 2 for purposes which will be hereinafter described.

The mirror carriage 16 may be mounted for selective positioning along the assembly frame 2 according to the knowledge of those skilled in the art. In some embodiments, multiple, adjacent frame teeth 7 may extend from the upper frame surface 6 between the forward frame end 3 and the rearward frame end 4 of the assembly frame 2. A toothed pinion gear 30 (FIG. 2) on the carriage frame 17 of the mirror carriage 16 meshes with the frame teeth 7 on the assembly frame 2. A pinion gear axle 31 may rotatably mount the pinion gear 30 between the pinion support segments 21 of the carriage frame arms 18. A longitudinal mirror positioning knob 32 may engage the pinion gear axle 31 for rotation. Therefore, the position of the mirror carriage 16 along the assembly frame 2 may be selectively adjusted by rotation of the longitudinal mirror positioning knob 32 such that the toothed pinion gear 30 meshes with the frame teeth 7 on the assembly frame 2 and the mirror carriage 16 travels forwardly or rearwardly on the assembly frame 2.

The assembly frame 2 may be attached to the handlebar 41 of the bicycle 40 according to any suitable attachment technique which is known by those skilled in the art. In some embodiments, the assembly frame 2 may be fitted with a frame attachment bracket 10 which may have any suitable design and facilitates attachment of the assembly frame 2 to the handlebars 41. As illustrated in FIG. 1, the frame attachment bracket 10 may generally include a pair of bracket clamps 11 one of which is attached to the assembly frame 2 via welding, mechanical fasteners (not illustrated) and/or other suitable technique which is known by those skilled in the art. Clamp fasteners 12 may attach the bracket clamps 11 to each other as is known by those skilled in the art.

Figure 6:
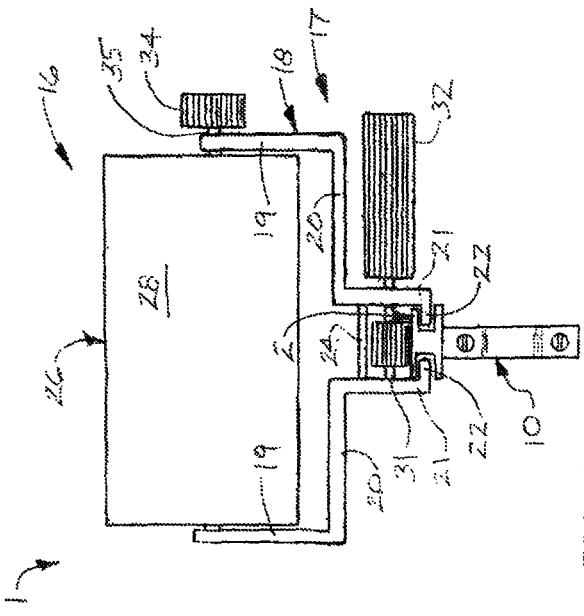
FIG. 6 is side view of an alternative illustrative embodiment of the forward view bicycle mirror assembly.
Figure 7:
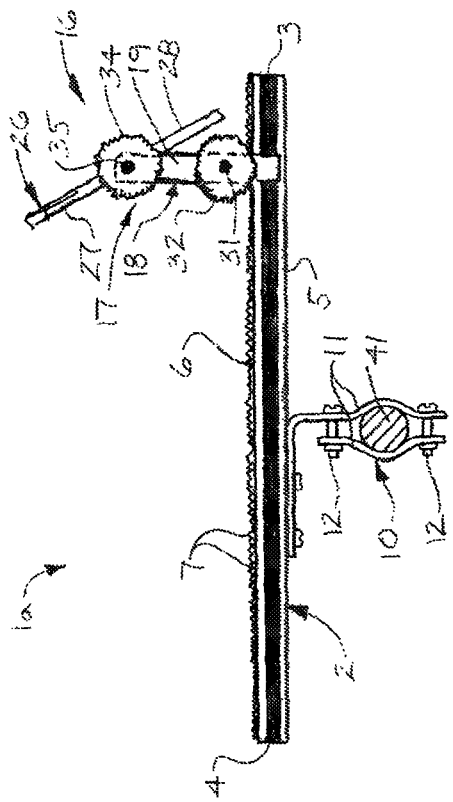
FIG. 7 is a front view of the illustrative forward view bicycle mirror assembly illustrated in FIG. 6

The frame attachment bracket 10 may be attached to the assembly frame 2 at any location on the assembly frame 2. As illustrated in FIG. 1, in some embodiments, the frame attachment bracket 10 may be attached to the rearward frame end 4 of the assembly frame 2. As illustrated in FIGS. 6 and 7, in other embodiments (generally indicated by reference numeral 1a), the frame attachment bracket 10 may be attached to the lower frame surface 5 of the assembly frame 2.

Referring again to FIGS. 4 and 5 of the drawings, in exemplary application, the bicycle mirror assembly 1 is attached to one of the handlebars 41 of the bicycle 40 and enables a bicycle rider 44 to view an area in front of the moving bicycle 40 on the reflective surface 28 of the forward view mirror 26 without the need for the bicycle rider 44 to continually maintain his or her head 45 in a raised and forward-viewing position. Images which appear on the reflective surface 28 may be upside-down. The assembly frame 2 of the bicycle mirror assembly 1 may be attached to the handlebar 41 using the frame attachment bracket 10 as was heretofore described with respect to FIGS. 1 and 4. The longitudinal frame axis 14 of the assembly frame 2 may be oriented in generally parallel relationship to the longitudinal bicycle axis 42 of the bicycle 40, as was heretofore described with respect to FIG. 4. The linear position of the forward view mirror 26 along the assembly frame 2 may be selected according to the preferences of the bicycle rider 44 typically by rotation of the longitudinal mirror positioning knob 32 (FIG. 2), as was heretofore described. Additionally, the angular position of the plane of the forward view mirror 26 relative to the plane of the assembly frame 2 may be selected to optimize forward viewing capability according to the preferences of the bicycle rider 44 by rotation of the angular mirror positioning knob 34. As illustrated in FIGS. 4 and 5, the bicycle rider 44 can keep his or her head 45 in a downward position and view the area in front of the moving bicycle 40 on the reflective surface 28 of the forward view mirror 26 without the need for the bicycle rider 44 to continually hold his or her head up in a forward-viewing position for the purpose. Accordingly, the neck muscles of the bicycle rider 44 do not tire as easily or quickly as would otherwise be the case if the bicycle rider 44 were required to maintain his or head 45 in a raised position to continually view the area in front of the moving bicycle 40. Consequently, the bicycle rider 44 remains more comfortable while riding the bicycle 40., particularly on long rides.

Figure 9:
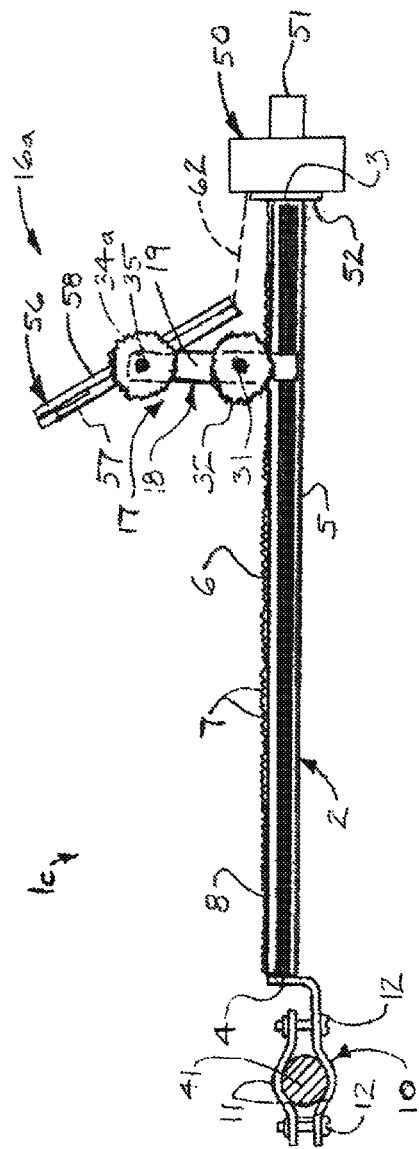
FIG. 9 is a side view of an illustrative embodiment of a forward view bicycle camera assembly having a camera and a display communicating with the camera.
Figure 10:
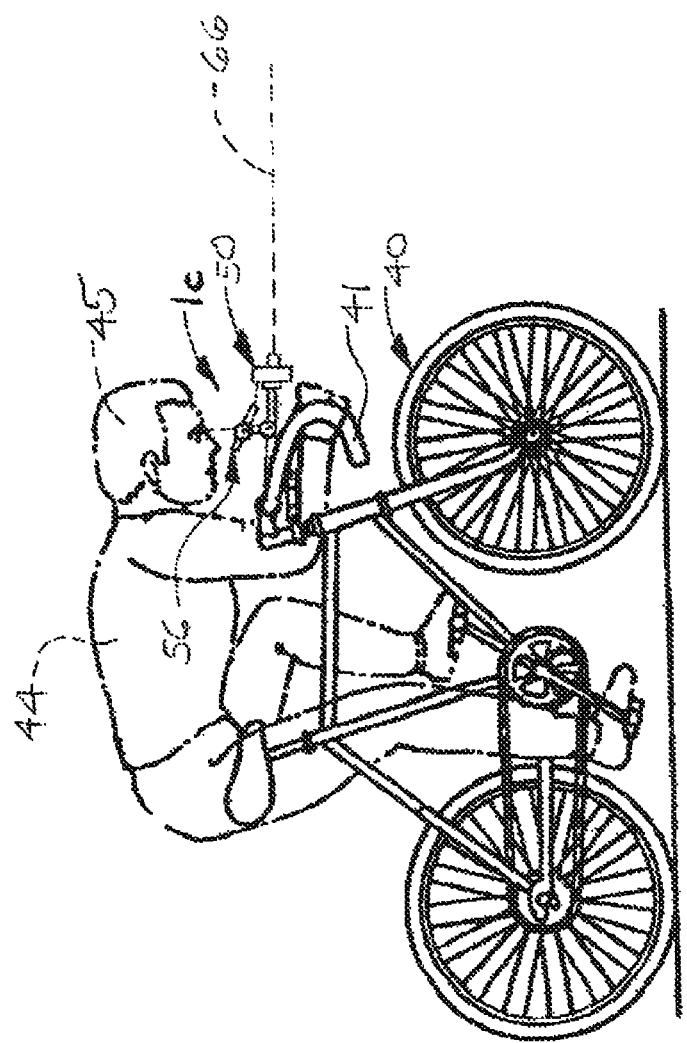
FIG. 10 is a side view of a bicycle, with an illustrative embodiment of the forward view bicycle camera assembly of FIG. 9 mounted on the bicycle and a rider pedaling the bicycle and viewing an area in front of the bicycle on the display.

Referring next to FIGS. 9 and 10 of the drawings, an illustrative embodiment of a forward view bicycle camera assembly, hereinafter assembly, is generally indicated by reference numeral 1c. The assembly 1c includes a camera 50 which may have a standard or conventional camera design and is provided on the assembly frame 2. The camera 50 has a forward-facing camera lens 51. In some embodiments, the camera 50 may be provided at the front frame end 3 of the assembly frame 2, as illustrated. The camera 50 may be attached to the assembly frame 2 using a camera mount bracket 52 or suitable alternative technique which is suitable for the purpose. As illustrated in FIG. 9, a display carriage 16a may have a design which is the same as or similar to that of the mirror carriage 16 of the bicycle mirror assembly 1 heretofore described with respect to FIGS. 1-3. A display 56 may be mounted on the mirror carriage 16. The display 56 may be a standard or conventional digital display known by those skilled in the art and may include a display base 57 which is mounted between the carriage frame arms 18. A display screen 58 is provided on the display base 57. The display 56 communicates with the camera 50 through a data receiving communication pathway 62. The data receiving communication pathway 62 may be a hardwired, cabled or wireless connection. Accordingly, images which are captured by the camera 50 are transmitted to the display 56 via the data receiving communication pathway 62. The captured images are displayed in real time on the display screen 58 of the display 56. The angle of the display 56 can be selectively adjusted by rotation of an angular display positioning knob 34 as was heretofore described with respect to angular adjustment of the front view mirror 26 using the angular mirror positioning knob 34 in FIG. 1.

While the embodiments of the disclosure have been described above, it will be recognized and understood that various modifications can be made and the appended claims are intended to cover all such modifications which may fall within the spirit and scope of the disclosure.

What is claimed is:

1. A forward view bicycle mirror assembly for attachment to a handlebar of a bicycle, comprising:
an elongated assembly frame adapted for attachment to the handlebar;
a pair of frame grooves in the assembly frame;
a plurality of frame teeth in the assembly frame;
a mirror carriage having a carriage frame slidably engaging the frame grooves in the assembly frame, the mirror carriage selectively adjustable in position along a longitudinal axis of the assembly frame;
a toothed pinion ear carried by the carriage frame and meshing with the frame teeth; and
a forward view mirror carried by the carriage frame of the mirror carriage.

2. The assembly of claim 1 wherein the forward view mirror is pivotally carried by the mirror carriage.

3. The assembly of claim 2 further comprising an angular mirror positioning knob engaging the forward view mirror.

4. The assembly of claim 1 further comprising a longitudinal mirror positioning knob engaging the pinion gear for rotation of the pinion gear.

5. The assembly of claim 1 further comprising a frame attachment bracket carried by the assembly frame, the frame attachment bracket adapted for attachment to the handlebar of the bicycle.

6. A forward view bicycle mirror assembly for attachment to a handlebar of a bicycle, comprising:
a generally elongated, rectangular assembly frame adapted for attachment to the handlebar, the assembly frame having a forward frame end, a rearward frame end, a first frame surface, a second frame surface and a pair of parallel, spaced-apart frame sides;
a pair of frame grooves in the assembly frame;
a plurality of frame teeth in the assembly frame;
a mirror carriage having a carriage frame slidably engaging the frame grooves in the assembly frame, the mirror carriage selectively adjustable in position along a longitudinal axis of the assembly frame and having a carriage frame including a pair of carriage frame arms and a frame arm connecting member connecting the carriage frame arms;
a toothed pinion gear carried by the carriage frame and meshing with the frame teeth; and
a forward view mirror carried by the carriage frame of the mirror carriage.

7. The assembly of claim 6 wherein the forward view mirror is pivotally carried by the mirror carriage.

8. The assembly of claim 7 further comprising an angular mirror positioning knob engaging the forward view mirror.

9. The assembly of claim 6 further comprising a longitudinal mirror positioning knob engaging the pinion gear for rotation of the pinion gear.

10. The assembly of claim 6 further comprising a frame attachment bracket carried by the assembly frame, the frame attachment bracket adapted for attachment to the handlebar of the bicycle.

11. A forward view bicycle mirror assembly for attachment to a handlebar of a bicycle, comprising:
a generally elongated, rectangular assembly frame adapted for attachment to the handlebar of the bicycle, the assembly frame having a forward frame end, a rearward frame end, a first frame surface, a second frame surface and a pair of parallel, spaced-apart frame sides;
a pair of frame grooves extending into and along the frame sides, respectively, of the assembly frame;
a plurality of frame teeth in the first frame surface of the assembly frame;
a mirror carriage slidably carried by the assembly frame, the mirror carriage selectively adjustable in position along a longitudinal axis of the assembly frame and having a carriage frame including a pair of generally symmetrical carriage frame arms in opposing relationship to each other on opposite sides of the assembly frame and a frame arm connecting member connecting the carriage frame arms;
the carriage frame arms of the carriage frame including a pair of generally parallel and spaced-apart mirror engaging segments, a pair of middle arm segments extending perpendicularly from the respective mirror engaging segments, a pair of generally parallel and spaced-apart pinion support segments extending perpendicularly from the respective middle arm segments and a pair of groove insertion segments extending perpendicularly inwardly toward each other from the respective pinion support segments and inserted in the frame grooves, respectively, of the assembly frame;

a toothed pinion gear carried by the carriage frame and meshing with the frame teeth on the assembly frame;

a longitudinal mirror positioning knob engaging the pinion gear for selective rotation of the pinion gear; and a forward view mirror pivotally carried by and between the mirror engaging segments of the carriage frame arms, respectively, of the mirror carriage, the forward view mirror including a mirror base and a convex reflective surface carried by the mirror base.

12. The assembly of claim 11 further comprising an angular mirror positioning knob engaging the forward view mirror.

13. The assembly of claim 11 further comprising a frame attachment bracket carried by the assembly frame, the frame attachment bracket adapted for attachment to the handlebar of the bicycle.

14. The assembly of claim 11 further comprising a pinion gear axle carried by the pinion support segments of the carriage frame arms, respectively, of the carriage frame and wherein the pinion gear is carried by the pinion gear axle.

* * * * *